(12) United States Patent
Henriksen (10) Patent No.: US 7,447,875 B1
(45) Date of Patent: Nov. 4, 2008

(54) METHOD AND SYSTEM FOR MANAGEMENT OF GLOBAL QUEUES UTILIZING A LOCKED STATE

(75) Inventor: Dana Henriksen, Lindon, UT (US)

(73) Assignee: Novell, Inc., Provo, UT (US)

( * ) Notice: Subject to any disclaimer, the term of this patent is extended or adjusted under 35 U.S.C. 154(b) by 382 days.

(21) Appl. No.: 10/724,269

(22) Filed: Nov. 26, 2003

(51) Int. Cl.
*G06F 9/30* (2006.01)

(52) U.S. Cl. ......................... 712/202; 710/54

(58) Field of Classification Search ............ 710/52, 710/53, 54; 712/202
See application file for complete search history.

(56) References Cited

U.S. PATENT DOCUMENTS

| | | | | |
|---|---|---|---|---|
| 5,319,778 A | * | 6/1994 | Catino | 707/102 |
| 5,546,391 A | * | 8/1996 | Hochschild et al. | 370/413 |
| 5,966,547 A | * | 10/1999 | Hagan et al. | 710/57 |
| 6,179,489 B1 | * | 1/2001 | So et al. | 718/102 |
| 6,480,918 B1 | * | 11/2002 | McKenney et al. | 710/200 |

OTHER PUBLICATIONS

Parlante, Nick, "Linked List Basics," 2001, Stanford CD Education Library, Document # 103.*
Greenwald, et al., The Synergy Between Non-Blocking Synchronization and Operating System Structure, Computer Science Department, Stanford University, Stanford CA.
Greenwald, et al., The Synergy Between Non-Blocking Synchronization and Operating System Structure, Computer Science Department, Stanford University, Stanford CA, publication date and year unknown.

* cited by examiner

*Primary Examiner*—Tonia L. M. Dollinger
(74) *Attorney, Agent, or Firm*—Haynes and Boone, LLP (57) ABSTRACT

A method and system for managing global queues is provided. In one example, a method for implementing a global queue is provided. The queue has a head pointer, a tail pointer, and zero or more elements. The method comprises one or more functions for managing the queue, such as an "add to end" function, an "add to front" function, an "empty queue" function, a "remove from front" function, a "remove specific" function and/or a "lock queue" function. In some examples, the method enables an element to be added to the queue even when the queue is in a locked state.

28 Claims, 6 Drawing Sheets

METHOD AND SYSTEM FOR MANAGEMENT OF GLOBAL QUEUES UTILIZING A LOCKED STATE

BACKGROUND

The present disclosure relates generally to data handling in digital devices and, more particularly, to a method and system for managing global queues.

In a multi-process or multiprocessor computing environment, queues are often used to share data between processes or processors. It may occur in such an environment that more than one process or processor is attempting to add or remove elements from a queue at the same time. To avoid data errors that may occur during such simultaneous data queue accesses, spinlocks may be used. A spinlock may place a process or processor attempting to access a queue that is currently already being accessed into a busy-wait state until the queue becomes available. However, the use of spinlocks may lead to inefficiencies because only one process may be allowed to access the queue at a given time, regardless of what function the process is performing on the queue. Further inefficiencies may occur since processes and processors may be left in a busy-wait state until the queue is available.

Accordingly, what is needed is an improved method and system of managing access to and performing operations on a queue.

SUMMARY

In one embodiment, a method for implementing a global queue is provided. The queue has a head pointer, a tail pointer, and a plurality of elements each having a next pointer. The method comprises defining a locked state for the queue, wherein a queue head pointer is null and a queue tail pointer does not point to the queue head pointer. The queue head pointer is defined to function as a next pointer of a last element of the plurality of elements when the queue is empty. An add to end function is defined for adding a new element to the queue even when the queue is in the locked state, the add to end function including setting a next pointer of the new element to null; as an atomic transaction, setting the queue tail pointer to point the new element, while saving a location of the last element; and setting the next pointer of the last element to point to an address of the new element by using the last element's saved location.

DETAILED DESCRIPTION

The present disclosure relates generally to data handling in digital devices and, more particularly, to a method and system for managing global queues. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not, in itself, dictate a relationship between the various embodiments and/or configurations discussed.

Figure 1A:
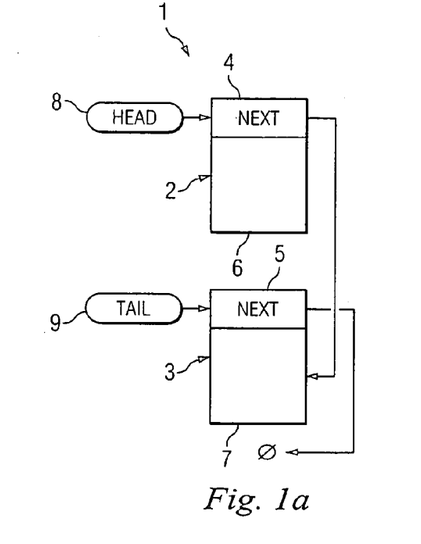
FIG. 1a illustrates an exemplary queue containing a plurality of elements.
Figure 1B:
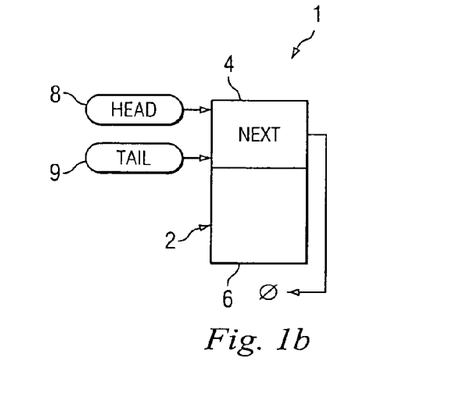
FIG. 1b illustrates the queue of FIG. 1a containing a single element.
Figure 1C:
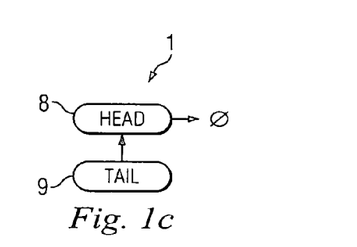
FIG. 1c illustrates the queue of FIG. 1a in an empty state.

Referring now to FIGS. 1a-1c, in one embodiment, three states of an exemplary global queue 1 are illustrated. As illustrated in FIG. 1a, the queue 1 has a plurality of elements 2, 3. The element 2 includes a next pointer 4 and a data structure 6, while the element 3 includes a next pointer 5 and a data structure 7.

In the present example, the elements 2, 3 are arranged as a linked list, such that the next pointer 4 of element 2 addresses element 3. In an alternate embodiment, the list may be a doubly linked list, where the element 3 includes a pointer that addresses element 2. The next pointer 5 of the element 2 (which is the last element in the linked list) is null. The element 2 is the first element (e.g., at the head of the queue) and the element 3 is the last element (e.g., at the tail of the queue).

The queue 1 may have a head pointer 8 that points to the front-most element 2 in the queue, as in FIGS. 1a and 1b. As illustrated in FIG. 1c, when the queue 1 is empty, the head pointer 8 is null. The queue 1 also has a tail pointer 9 that points to the last element (e.g., element 3 in FIG. 1a; element 2 in FIG. 1b) in the queue. When the queue 1 is empty, the tail pointer 9 points to the head 8. As illustrated in FIG. 1b, the head pointer 8 and tail pointer 9 may point to the same element when there is only one element (e.g., element 2) in the queue.

Figure 1D:
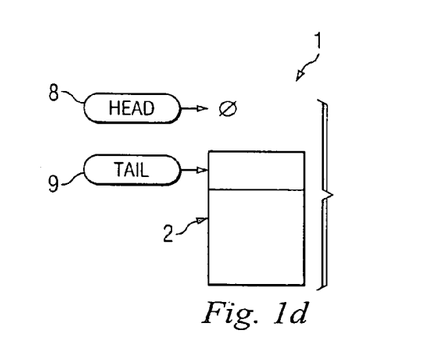
FIG. 1d illustrates the queue of FIG. 1a in a locked state.

Referring now to FIG. 1d, the queue 1 may be placed in a locked state where the head pointer 8 is null and the tail pointer 9 does not point to the head. The tail pointer 9 may be pointing, for example, to the element 2. In an alternate embodiment, as explained below in greater detail, the queue 1 may operate without a locked state by allowing only one processor to remove elements from the queue, while a plurality of processors may be allowed to add elements to it.

The queue 1 may be manipulated using a variety of functions. It is understood that some functions may manipulate the queue 1 in similar ways, but may be implemented differently.

For example, functions may be implemented differently if only one processor, rather than multiple processors, is allowed to remove elements from the queue.

Some functions may be used to add new elements to the queue 1, including an "add to end" function 10, and/or an "add to front" function 12. Functions may also be provided for removing elements from the queue 1, such as an "empty queue" function 13 that may remove all elements from the queue, a "remove from front" function 14 that may remove the first element, or a "remove specific" function 15 that may search the queue to remove a specific element. An alternate "add to end" function 16, "empty queue" function 17, and a "remove from front" function 18 may also be provided.

In one embodiment, a "lock queue" function 11 may allow only one function at a time to remove elements from the queue or to add elements at the head. While locked, a new element may be added to the end of the queue regardless of whether the queue is locked, as explained in greater detail below. An unlocking function may not be needed as the queue may be configured such that it is implicitly unlocked by the original function, which called the locking function.

Figure 2:
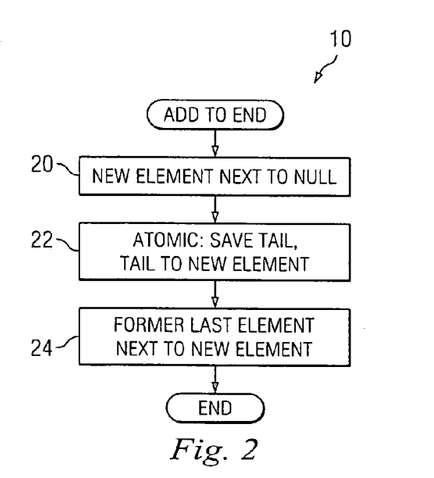
FIG. 2 is a flow chart of an exemplary "add to end" function that may be used with a queue.

Referring now to FIG. 2, the add to end function 10 may allow any processor or thread to add an element at the tail of the queue regardless of whether the queue is locked. In step 20, the next pointer of the element being added may be set to null. In step 22, an atomic exchange may be performed using an atomic transaction comprising saving the value of the tail pointer 9 while setting the tail pointer to point to the new element being added. In step 24, by using the saved tail value, the next pointer of the former last element may be set to point to the element being added.

Since an atomic transaction may be used when modifying the tail of the queue 1, the tail may always be available to any processor or thread to add new elements to the queue. In this embodiment, the add to end function 10 may be used either in a threading or interrupt driven context. Performance gains may be realized because the interrupt state of the adding processor may not need to be changed. Gains may also be realized, in either a multiprocessor or a threading environment, since it may not be necessary to obtain a lock in order to add an element at the tail of the queue.

During execution of the add to end function 10, after completion of the atomic exchange in step 22, the queue 1 may be in an inconsistent state since the next pointer of the previous tail element may not immediately point to the newly added element, as may the tail pointer 9. As will be explained below, the traversing and removing functions may detect this condition and wait for the memory writes of the add to end function 10 to complete. Thus, it may not be necessary to obtain a lock prior to adding new elements to the queue.

Figure 3:
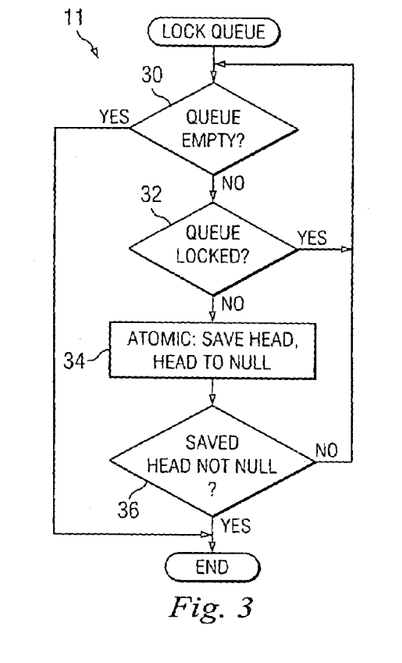
FIG. 3 is a flow chart of an exemplary "lock queue" function that may be used with a queue.

Referring now to FIG. 3, the lock queue function 11 may lock the queue 1, as may be needed by functions that search the queue, add elements to the beginning of the queue, or remove elements from the queue. In step 30, the lock queue function 11 may test whether the queue is empty, and if so, exit so that an empty queue is not locked needlessly. As stated before, the queue 1 may be empty when the head pointer 8 is null and the tail pointer 9 points to the head pointer. In step 32, the lock queue function 11 may test whether the queue is already locked (e.g., whether the head pointer is null but the tail does not point to the head pointer). If the queue is locked, the process of testing for emptiness in step 30 and testing for a lock in step 32 may be repeated until one of the conditions is true.

If the queue is neither empty nor locked, an atomic exchange may be performed in step 34, wherein the value of the head pointer 8 is saved and the head pointer is set to null.

The returned value from the exchange may be tested in step 36 and, if the return value is null, the lock queue function 11 may return to the testing state in step 30. Accordingly, two functions may not obtain a lock on the queue 1 at one time, since one of them will compete the atomic exchange first and the other may test for that condition by checking the return value from its own atomic exchange. It is understood that the lock queue function 11 may be configured to return whatever value is desired, including the saved value of the head pointer, a Boolean value, a pointer, or no value at all.

Figure 4:
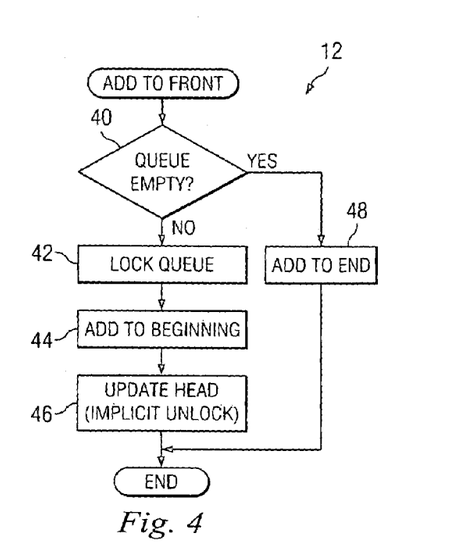
FIG. 4 is a flow chart of an exemplary "add to front" function that may be used with a queue.

Referring now to FIG. 4, the queue 1 may include an add to front function 12, wherein an element is placed at the head of the queue. If the queue 1 is empty in step 40, an add to end function (e.g., the add to end function 10) may be used in step 48 and without involving a locking process. If the queue 1 is not empty in step 40, the queue may be locked in step 42. The new element may then be added to the beginning of the queue 1 in step 44. The next pointer of the element being added may be set to the saved value of the head pointer 8 (as may have been returned by the lock queue function). The head pointer 8 may then be set to point to the newly added element in step 46, implicitly unlocking the queue 1 without an additional memory write or function call.

Figure 5:
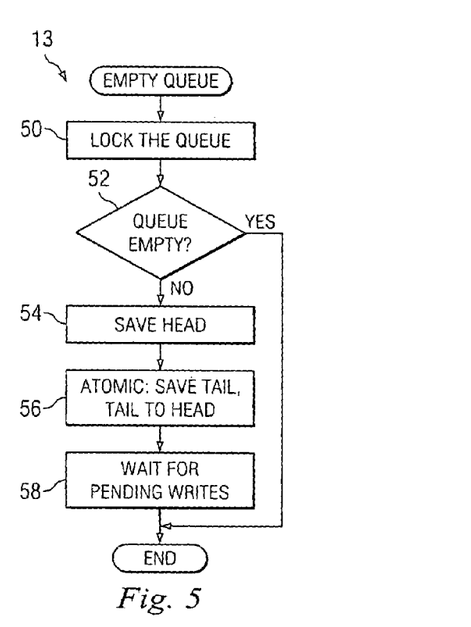
FIG. 5 is a flow chart of an exemplary "empty queue" function that may be used with a queue.

Referring now to FIG. 5, the empty queue function 13 may remove all elements from the queue 1. This empty queue function 13 may return a pointer to a linked list of the elements formerly in the queue 1, but may also be configured to do otherwise. The queue 1 may be locked in step 50 and then tested for emptiness in step 52. If the queue 1 is not empty, the value of the head pointer 8 (as may have been passed back from the lock queue function 11 described above) may be saved in step 54. An atomic transaction may be performed in step 56, wherein the value of the tail pointer 9 may be saved and the tail pointer set to point to the head pointer 8. Note that this step may put the queue 1 back into a valid, empty state. Thus the queue 1 may be implicitly unlocked with no need to consume additional resources (e.g. by calling a separate unlock function or performing an additional memory write).

The empty queue function 13 may now wait for any pending writes to complete in step 58 since an add to end function (e.g., the add to end function 10) may have begun execution before the atomic exchange of step 56. The dequeued elements may be traversed starting with the saved value of the head pointer 8. When an element is encountered with a next pointer that is null, it may be compared against the saved tail pointer. If the saved tail pointer does not address the element, the empty queue function 13 may wait until the element's next pointer is not null and proceed down the linked list comprising the queue 1. When the element is found with a next pointer that is null and the element is also addressed by the saved tail pointer, the saved head pointer may address a valid linked list containing all of the elements formerly in the queue.

Figure 6:
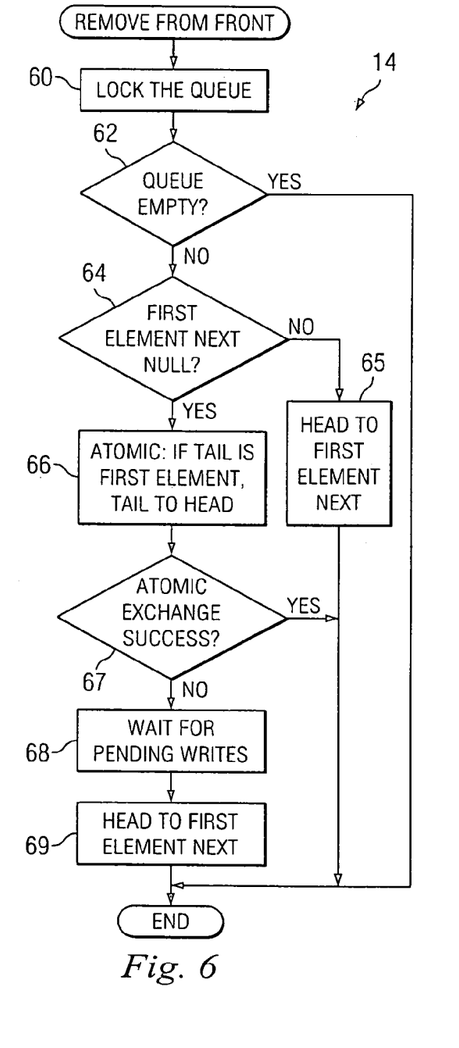
FIG. 6 is a flow chart of an exemplary "remove from front function" that may be used with a queue.

Referring now to FIG. 6, the remove from front function 14 may remove the front-most element (e.g., the element 2 of FIG. 1a) from the queue 1. The queue 1 may be locked in step 60 and tested for emptiness in step 62. If the queue 1 is not empty and the next pointer 4 of the first element 2 is determined to not be null in step 64, the head pointer 8 may be set to the address of the next pointer 4 of the first element 2 in step 65. This may implicitly unlock the queue 1 and complete the function. The dequeued element may be returned by value, or reference, to a calling function.

If the next pointer 4 of the first element 2 does point to null as determined in step 64, an atomic compare and exchange may be performed in step 66. In step 66, if the tail element is also the first element, the tail pointer 9 may be set to point to the head 8. If this exchange is successful in step 67, the remove from front function 14 may end and implicitly unlock the queue 1. If the exchange in step 66 was not successful (as determined in step 67), a wait state may be entered in step 68 until the next pointer of the front-most element is not null. The head pointer 8 may then be set to the element addressed by the next pointer of the front-most element in step 69. This may implicitly unlock the queue 1 and the dequeued element may be returned by value, or reference, if needed.

Figure 7A:
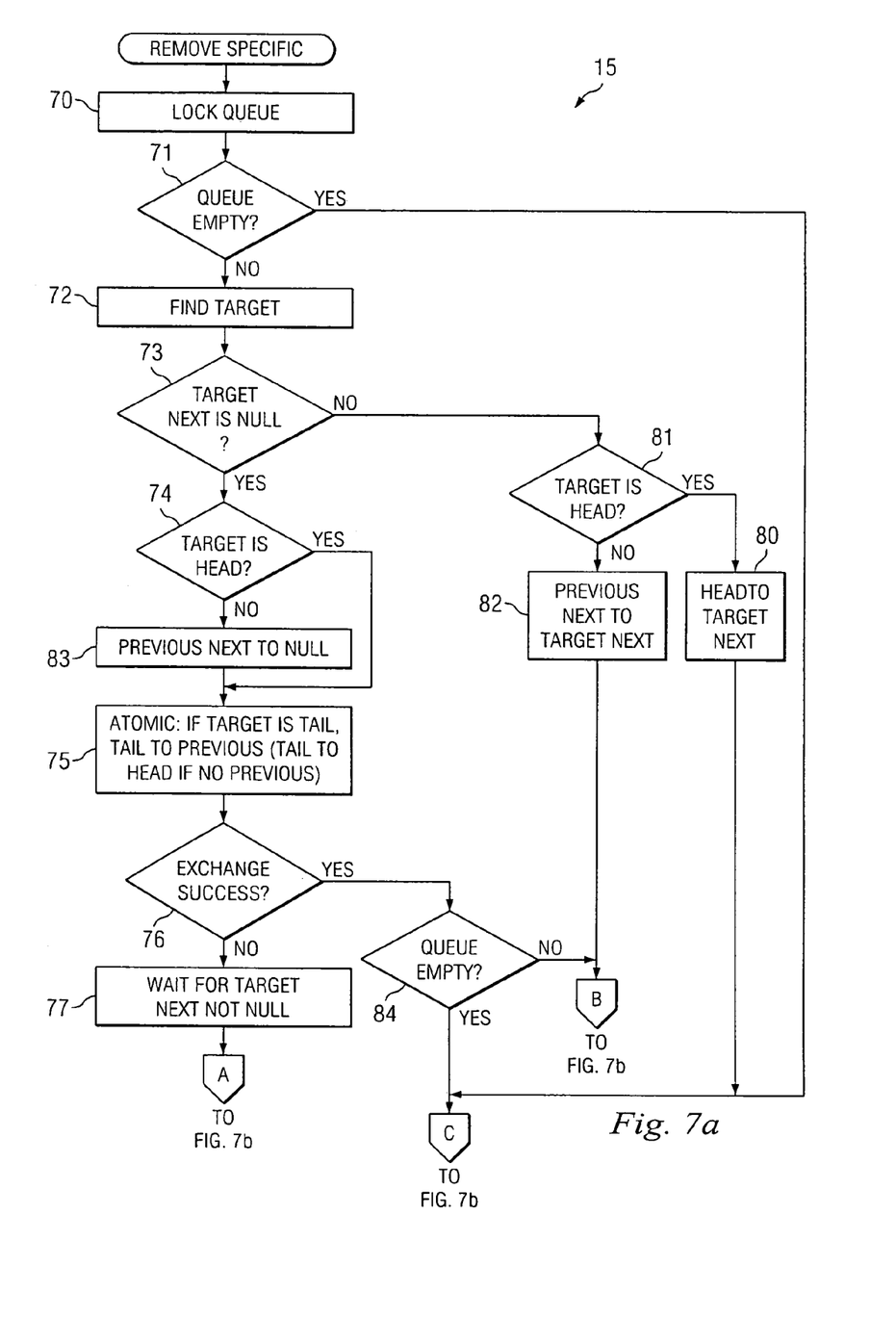
FIGS. 7a and 7b collectively illustrate flow chart of an exemplary "remove specific" function that may be used with a queue.
Figure 7B:
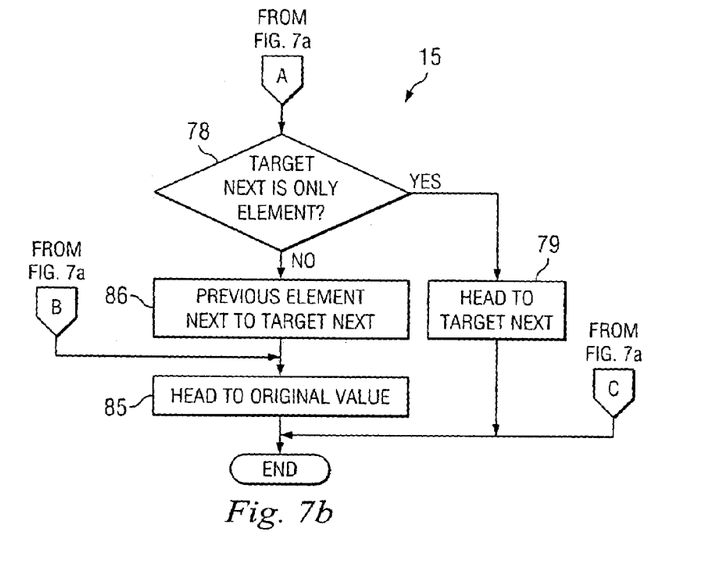

Referring now to FIGS. 7a and 7b, the remove specific function 15 may search for and remove a specific target element from the queue 1. The queue 1 may be locked in step 70 and tested for emptiness in step 71. If the queue 1 is not empty, the remove specific function 15 may proceed by traversing the elements of the queue until the target element is located in step 72. If and when the target element is found, determinations are made in steps 73 and 81 as to whether the target element's next pointer is not null and whether the target element is at the head of the queue. If not null and at the head of the queue, the head pointer 8's value may be set to the address in the target element's next pointer in step 80, implicitly unlocking the queue. If the target element's next pointer is not null (as determined in step 73), but the target is not at the head (as determined in step 81), the next pointer of the element previous to the target element may be set to the address contained in the target element's next pointer in step 82. The head pointer 8 may be returned to its original value in step 85 (which may have been returned by the lock queue function 11). The queue 1 may also be implicitly unlocked by step 85.

If the target element's next pointer is null (as determined in step 73), and the target element is not the head (as determined in step 74), the next pointer of the element prior to the target element may be set to null in step 83. However, if the target element's next pointer is null and the target element is at the head, step 83 may be skipped. An atomic compare and exchange may be performed in step 75. During this atomic exchange, if the target element is the last element, the tail pointer 9 is set to point to the element ahead of the target element or, if there is no element ahead of the target element, the tail pointer is set to point to the head pointer 8.

If the atomic compare and exchange of step 75 was performed successfully (as determined in step 76), and the queue 1 is empty (as determined in step 84), the queue may be implicitly unlocked, and the remove specific function 15 may be complete. If the queue 1 is not empty, the head pointer 8 may be returned to the saved value of the head pointer, thereby implicitly unlocking the queue. In either case, the target element may be returned to the calling function.

If the atomic compare and exchange in step 75 was not performed successfully (as determined in step 76), the remove specific function 15 may enter a wait state in step 77 until the next pointer of the target element is non-null. If the element addressed by the next pointer of the target element is the last element remaining in the queue (other than the target element) as determined in step 78, the head pointer 8 may be set to address that element in step 79, thereby implicitly unlocking the queue. However, if the element addressed by the next pointer of the target element is not the last element in the queue in step 78, the next pointer of the element previous to the target element may be set to address the element pointed to by the next pointer of the target element in step 86. The head pointer 8 may then be returned to its original value in step 85, implicitly unlocking the queue. The target element may then be returned to a calling function.

In another embodiment, the global queue 1 may be accessed by multiple processors. Here again, the tail pointer 9 may be available for any processor to add to the queue at any time. However, in this embodiment, only one processor may be allowed to remove elements from the queue. Accordingly, there may be no need for a locking function, or for implicit unlocking, and the need for atomic transactions may be reduced.

Figure 8:
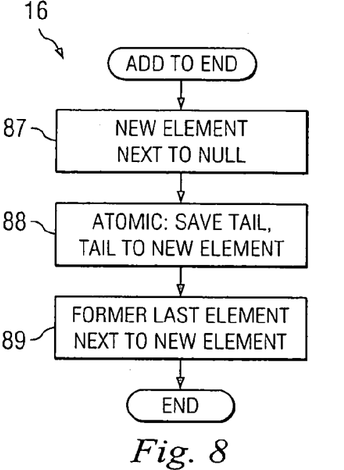
FIG. 8 is a flow chart of another exemplary "add to end" function.

Referring now to FIG. 8, an add at end function 16 may be defined for the queue 1. The next pointer of the new element may be set to null in step 87. As an atomic transaction, the value of the tail pointer 9 may be saved and the tail pointer directed to the new element in step 88. Using the saved tail pointer value, the next pointer of the former tail element may be set to address the new element in step 89.

As before, atomic transactions may be used when modifying the tail pointer 9. Accordingly, if there are competing processors adding to the queue 1 at the same time, one processor will complete its atomic transaction first, and the tail of the queue may always be available for adding new elements. Although the queue 1 may be in an inconsistent state after step 88 while the write of step 89 is pending, as explained in detail below, the processor that removes elements may detect this condition and wait for writes to complete before proceeding.

Figure 9:
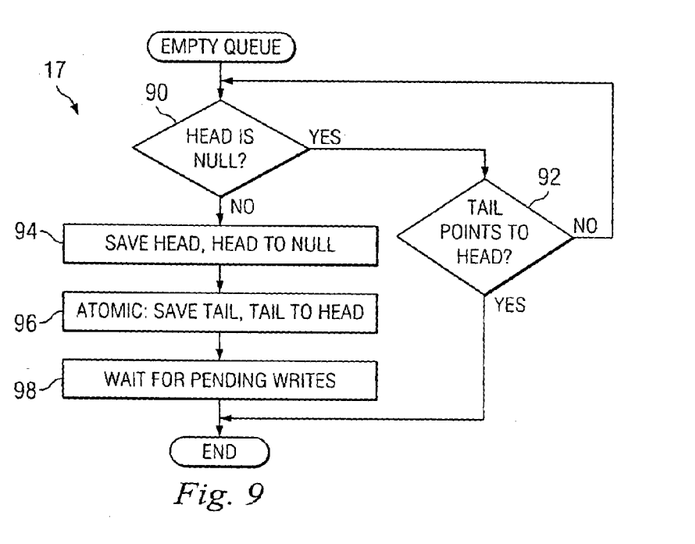
FIG. 9 is a flow chart of another exemplary "empty queue" function.

Referring to FIG. 9, an empty queue function 17 that is accessible to only one processor may be defined for the queue 1. If the head pointer 8 is null (as determined in step 90) and the tail pointer 9 points to the head pointer (as determined in step 92), then the queue may already be empty. However, if the head pointer 8 is null (as determined in step 90), but the tail pointer 9 does not point to the head pointer (as determined in step 92), then another processor may adding an element at the head of the queue and the empty queue function 17 may wait by repeating steps 90 and 92. When the head pointer 8 is determined to be non-null in step 90, the empty queue function 17 may proceed to save the value of the head pointer 8 and then set it to null in step 94. An atomic transaction may not be needed. However, an atomic transaction may be used to save the value of the tail pointer 9 and point the tail to the head in step 96. At this point, the queue 1 may be in a valid, empty state and ready for new elements to be added.

Using the saved head and tail pointers, the linked list forming the queue 1 may be traversed from beginning to end in step 98, stopping at each element to see that any pending writes have completed. If the next pointer of any element other than that addressed by the saved tail pointer is null, the empty queue function 17 may wait for a non-null value to appear. At the end of step 98, a valid linked list may exist containing all of the elements formerly in the queue.

Figure 10:
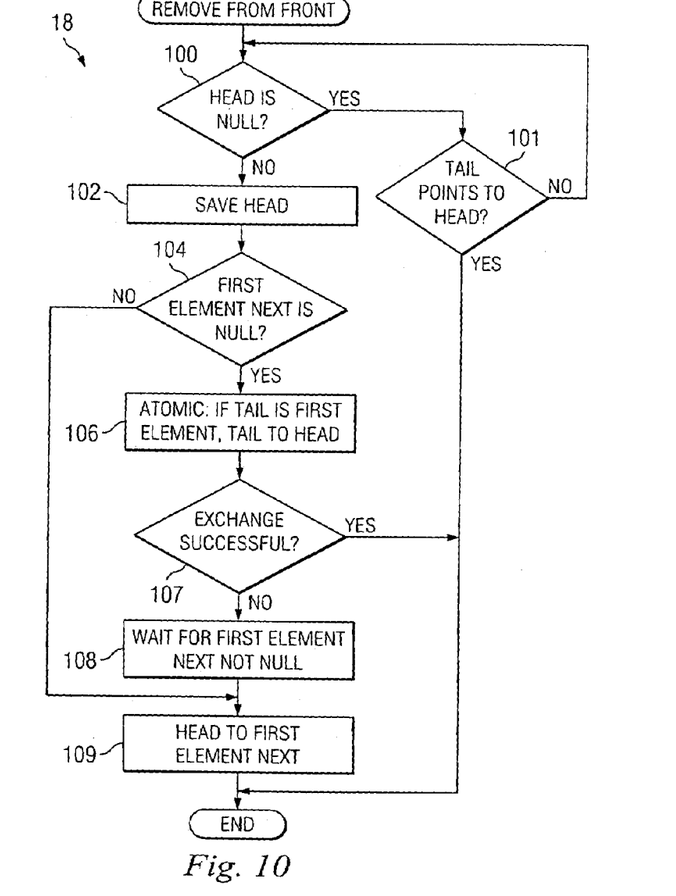
FIG. 10 is a flow chart of another exemplary "remove from front" function.

Referring now to FIG. 10, a remove from front function 18 may be defined for the queue 1. If the head pointer 8 is null (as determined in step 100) and the tail pointer 9 points to the head pointer (as determined in step 101), then the queue 1 may already be empty. However, if the head pointer 8 is null, but the tail pointer 9 does not point to the head pointer, then another processor may be adding an element at the head of the queue and the remove from front function 18 may wait by repeating steps 100 and 101. When the head pointer 8 is determined to be non-null in step 100, the remove from front function 18 proceeds by saving the value of the head pointer 8 in step 102. If the next pointer of the first element in the queue 1 is not null (as determined in step 104), the head pointer 8 may be set to the next pointer of the first element in step 109, implicitly unlocking the queue and completing the remove from front function 18.

If the next pointer of the first element is null (as determined in step 104), an atomic compare and exchange may be performed in step 106. During this atomic transaction, if the tail pointer 9 points to the first element, then the tail pointer is directed to the head pointer 8. If the atomic transaction was successful (as determined in step 107), the remove from front function 18 may be complete. However, if the atomic transaction was not successful, another function or processor may be adding an element to the queue. Accordingly, the remove from front function 18 may wait in step 108 until the next pointer of the first element takes on a non-null value. The head pointer 8 may then be set to the value of the next pointer of the first element in step 109. The dequeued first element may now be addressed by the saved head pointer value and may be returned to the calling function or processor.

Figure 11:
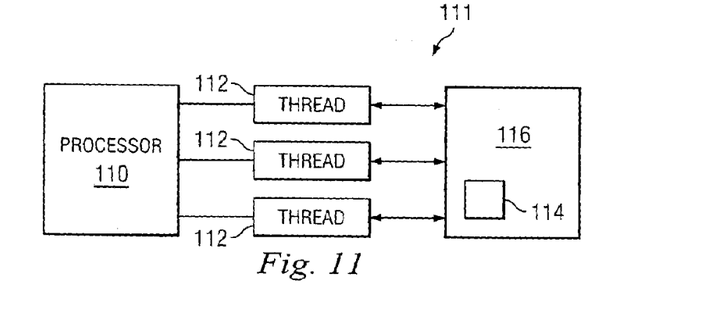
FIG. 11 illustrates an exemplary threaded environment in which the queue of the present disclosure may operate.

Referring to FIG. 11, in yet another embodiment, an exemplary environment 111 is illustrated in which a global queue (e.g., the global queue 1 of FIGS. 1a-1d) may operate. This environment may be, but is not limited to, a personal computer, a personal digital assistant (PDA), a cellular telephone, or another electronic device. In the present example, a processor 110 may execute multiple processes or threads 112. The processor 110 may be a single processor or multiple processors. The threads 112 may be from the same or different processors and executing the same or different code. Each thread 112 may have access to the global queue 114, which may reside in memory 116. The memory 116 may be a volatile, random access memory (RAM), a non-volatile memory such as a hard disk drive, or may be an on-board memory or cache associated with the processor 10. To avoid conflicts when accessing or manipulating the queue 114, the processor 110 may execute some or all of the previously described functions 10-18.

Figure 12:
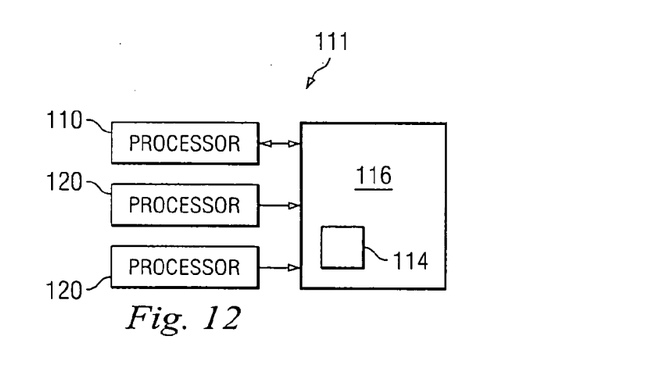
FIG. 12 illustrates an exemplary multiprocessor environment in which the queue of the present disclosure may operate.

Referring to FIG. 12, in still another embodiment, an alternative environment 111 is illustrated in which a global queue (e.g., the global queue 1 of FIGS. 1a-1d) may operate. As with FIG. 11, the environment 111 may include many different devices or systems. In the present example, there is a processor 110 that is allowed to access the global queue 114 for both adding and removing elements. In addition, there may be one or more processors 120 which are only allowed to add elements to the tail of the queue 114. To avoid conflicts when accessing or manipulating the queue 114, the processors 110, 120 may execute some or all of the previously described functions 10-18.

Figure 13:
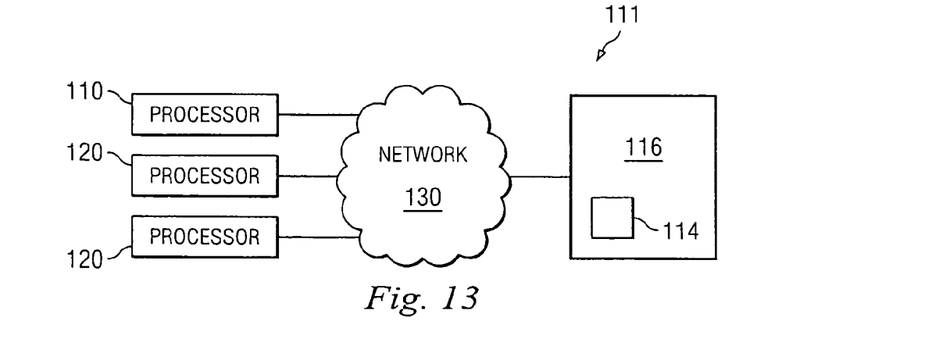
FIG. 13 illustrates an exemplary networked environment in which the queue of the present disclosure may operate.

Referring now to FIG. 13, in yet another embodiment, another alternative environment 111 is illustrated in which a global queue (e.g., the global queue 1 of FIGS. 1a-1d) may operate via a distributed computing environment. The queue 114 may reside in memory 116 which may or may not be associated with the processors 110, 120. The memory 116 may be a volatile, random access memory, a non-volatile memory such as a hard disk drive, or on board memory or cache associated with a processor. The memory 116 and the queue 114 therein may be accessed via a network 130. The network 130 may be a local area network, the Internet, an intranet, a wireless network, or some other network of electronic devices. The queue 114 may be implemented so that only a single processor 110 may both add and remove elements from the queue 114, while one or more of the processors 120 may only add elements. To avoid conflicts when accessing or manipulating the queue 114, the processors 110, 120 may execute some or all of the previously described functions 10-18.

While the disclosure has been shown and described with reference to particular embodiments thereof, it will be understood by those skilled in the art that various changes in form and detail may be made without departing from the scope and spirit of the disclosure. For example, various steps in the functions described above may be omitted or altered. Furthermore, some steps may be moved to other positions within the illustrated flow charts. In addition, steps may be added to some functions. Therefore, it is understood that several modifications, changes, or substitutions are intended in the foregoing disclosure and in some instances, some features of the disclosure may be employed without a corresponding use of other features.

Accordingly it is appropriate that the following claims be construed broadly and in a manner consistent with the scope of the disclosure.

What is claimed is:

1. A method for implementing a global queue, wherein the queue has a head pointer, a tail pointer, and a plurality of elements each having a next pointer, the head pointer functioning as a next pointer of a last element of the plurality of elements when the queue is empty, the method comprising:
   executing an add to end function for adding a new element to the tail end of the queue even when the queue is in a locked state immediately prior to execution of the add to end function in which the queue head pointer is null and a queue tail pointer does not point to the queue head pointer, the executing an add to end function including:
   setting a next pointer of the new element to null;
   as an atomic transaction, setting the queue tail pointer to point the new element while saving a location of the last element; and
   setting the next pointer of the last element to point to an address of the new element by using the last element's saved location.

2. The method of claim 1 further comprising executing a locking function of the queue, the locking function including:
   if the queue is not empty and not locked, as an atomic transaction, setting the head pointer to null and retaining a previous value of the head pointer; and
   if the previous value of the head pointer is null and the queue is not empty, repeating the locking function.

3. The method of claim 2 wherein the queue is unlocked in a first situation in which the head pointer is not null and in a second situation in which the head pointer is null and the tail pointer points to the head pointer.

4. The method of claim 2 further comprising executing an add to front function for adding the new element to a front position of the queue, the add to front function including:
   if the queue is empty, adding the new element to the tail end position of the queue; and
   if the queue is not empty:
      locking the queue;
      setting the next pointer of the new element to the previous value of the head pointer; and
      pointing the head pointer to the new element, thereby unlocking the queue.

5. The method of claim 2 further comprising executing a remove from front function to remove a front-most element from the queue, the remove from front function including:
   locking the queue;
   if the queue is not empty and an element occupying a front-most position of the queue has a next pointer that is not null, setting the head pointer to the address in the front-most element's next pointer; and
   if the queue is not empty and the front-most element's next pointer is null, as an atomic compare and exchange, if the tail pointer points to the front-most element, pointing the tail pointer to the head pointer, thereby implicitly unlocking the queue.

6. The method of claim 5 further comprising, responsive to a failure of the atomic compare and exchange, waiting for the next pointer of the front-most element to become non-null, and pointing the head pointer to an element pointed to by the next pointer of the front-most element, thereby implicitly unlocking the queue.

7. The method of claim 2 further comprising executing a remove specific function to remove a target element from the queue, the remove specific function including:
   locking the queue; and
   if the queue is not empty:
      traversing the queue to locate the target element;
      if the target element's next pointer is not null and the target is not addressed by the previous value of the head pointer, setting the next pointer of an element previous to the target to point to an element pointed to by the target's next pointer; and
      returning the head pointer to the previous value, thereby implicitly unlocking the queue.

8. The method of claim 7 further comprising:
   if the target element's next pointer is not null and the target is addressed by the previous value of the head pointer, setting the head pointer to point to the element pointed to by the target's next pointer, thereby implicitly unlocking the queue; and
   if the target's next pointer is null and the target is not addressed by the previous value of the head pointer, setting the next pointer of the element previous to the target to null.

9. The method of claim 8 further comprising:
   if the target's next pointer is null, as an atomic compare and exchange, if the tail pointer points to the target setting the tail pointer to point to the element previous to the target, or to point to the head pointer if the target is addressed by the previous value of the head pointer;
   if the atomic compare and exchange was performed and failed:
      waiting until the target's next pointer is not null;
      if an element addressed by the target's next pointer is an only remaining element in the queue, setting the head pointer to point to the only remaining element, thereby implicitly unlocking the queue; and
      if the element addressed by the target's next pointer is not the only remaining element in the queue, setting the next pointer of the element previous to the target to the address in the target's next pointer and setting the head pointer to the previous value of the head pointer, thereby implicitly unlocking the queue; and
   if the atomic compare and exchange was performed and succeeded:
      if the queue is not empty, setting the head pointer to the previous value of the head pointer, thereby implicitly unlocking the queue.

10. The method of claim 1 further comprising executing an empty function for removing each of the plurality of elements from the queue, the empty function including:
   locking the queue; and
   if the queue is not empty:
      as an atomic transaction, pointing the tail pointer to the head pointer while retaining a previous value of the head pointer and the tail pointer, thereby implicitly unlocking the queue; and
      by using the previous values of the head pointer and tail pointer, traversing a plurality of the elements which have been dequeued, and waiting for the next pointer of each element not addressed by the previous value of the tail pointer to become non-null.

11. A method for implementing a global queue in a multi-processor environment, wherein the queue has a head pointer to point to a first element of the queue or to null if the queue is empty, a tail pointer to point to a last element of the queue or to the head pointer if the queue is empty, and a plurality of elements each containing a next pointer for pointing to a next element in the queue or to null when the element occupies a last position in the queue, the head pointer functioning as a next pointer of the last element of the queue when the queue is empty the method comprising:
   allowing a first processor to both add and remove elements from the queue;
   allowing a second processor to only add new elements to the queue; and
   executing an add to end function for adding the new element to the tail end of the queue, even when the queue is in a locked state immediately prior to execution of the add to end function in which the queue head pointer is null and a queue tail pointer does not point to the queue head pointer, wherein the executing an add to end function includes:
      setting the next pointer of the new element to null;
      as an atomic transaction, setting the tail pointer to point the new element, while saving a location of the last element; and
      setting the next pointer of the last element to point to the address of the new element by using the last element's saved location.

12. The method of claim 11 further comprising executing an empty function for removing each element from the queue, the empty function including waiting until the head pointer is not null or until the queue is empty, and if the queue is not empty:
   saving a value of the head pointer;
   setting the head pointer to null;
   as an atomic transaction, pointing the tail pointer to the head pointer while saving a value of the tail pointer; and
   using the saved values of the head pointer and tail pointer, traversing the dequeued elements and waiting for the next pointer of each element not addressed by the saved value of the tail pointer to become non-null.

13. The method of claim 11 further comprising executing a remove from front function for removing a front-most element from the queue, the remove from front function including waiting until the head pointer is not null or until the queue is empty, and if the queue is not empty:
   if the front-most element's next pointer is not null, setting the head pointer to an address of the front-most element's next pointer;
   if the front-most element's next pointer is null, as an atomic compare and exchange, if the tail pointer points to the front-most element, pointing the tail pointer to the head pointer.

14. The method of claim 13 further comprising, responsive to a failure of the atomic compare and exchange, waiting for the next pointer of the front-most element to become non-null, and pointing the head pointer to the element pointed to by the next pointer of the front-most element.

15. A system for implementing a global queue, wherein the queue has a head pointer to point to a first element of the queue or to null if the queue is empty and to function as a next pointer of a last element when the queue is empty, a tail pointer to point to the last element of the queue or to the head pointer if the queue is empty, and a plurality of elements each having a next pointer for pointing to a next element in the queue or to null when the element occupies a last position in the queue, the system comprising;
   a first processor;
   a plurality of instructions for execution on at least the first processor, the instructions including instructions for:

executing a locked state for the queue; and subsequent to execution of the locked state, executing an add at end function for adding a new element to the tail end of the queue even when the queue is in a locked state in which the queue head pointer is null and a queue tail pointer does not point to the queue head pointer, the add at end function including setting the next pointer of the new element to null; as an atomic transaction, setting the tail pointer to point the new element, while saving a location of the last element; and setting the next pointer of the last element to point to the address of the new element by using the last element's saved location.

16. The system of claim 15 further comprising:

a second processor; wherein in the locked state only the first processor is allowed to remove elements from the queue.

17. The system of claim 16 further comprising instructions for executing an empty function for removing each element from the queue, the empty function comprising:

waiting until the head pointer is not null, or until the queue is empty; and if the queue is not empty:

saving a value of the head pointer;

setting the head pointer to null;

as an atomic transaction, pointing the tail pointer to the head pointer while saving a value of the tail pointer;

and using the saved values of the head pointer and tail pointer, traversing the dequeued elements and waiting for the next pointer of each element not addressed by the saved value of the tail pointer to become non null.

18. The system of claim 16 further comprising instructions for executing a remove from front function for removing a front-most element from the queue, the remove from front function comprising:

waiting until the head pointer is not null or until the queue is empty, and if the queue is not empty:

if the front-most element's next pointer is not null, setting the head pointer to the address in the front-most element's next pointer; and if the front-most element's next pointer is null, as an atomic compare and exchange, if the tail pointer points to the front-most element, pointing the tail pointer to the head pointer.

19. The system of claim 18 further comprising instructions for, responsive to a failure of the atomic compare and exchange, waiting for the next pointer of the front-most element to become non-null and pointing the head pointer to the element pointed to by the next pointer of the front-most element.

20. The system of claim 15 wherein the queue is unlocked in a first situation in which the head pointer is not null, and in a second situation in which the head pointer is null and the tail pointer points to the head pointer.

21. The system of claim 20 wherein the instructions for executing a locked state for the queue comprise:

instructions for locking the queue when the head pointer is null and the tail pointer does not point to the head pointer; and instructions for executing a locking function for the queue, the instructions for executing a locking function comprising:

if the queue is not empty and not locked, as an atomic transaction, setting the head pointer to null and retaining a previous value of the head pointer; and if the previous value of the head pointer is null and the queue is not empty, repeating the locking function.

22. The system of claim 15 further comprising instructions for executing an add to front function, wherein the new element is added to a front position of the queue, the instructions for executing an add to front function comprising instructions for:

if the queue is empty, adding the new element to a last position of the queue; and if the queue is not empty:

locking the queue;

saving a previous value of the head pointer;

setting the next pointer of the new element to the previous value of the head pointer; and pointing the head pointer to the new element, thereby unlocking the queue.

23. The system of claim 15 further comprising instructions for executing an empty function for removing each element from the queue, the instructions for executing an empty function comprising instructions for:

locking the queue; and if the queue is not empty:

as an atomic transaction, pointing the tail pointer to the head pointer while saving a value of the head and tail pointers, thereby implicitly unlocking the queue; and by using the saved values of the head pointer and tail pointer, traversing the dequeued elements and waiting for the next pointer of each element not addressed by the saved value of the tail pointer to become non null.

24. The system of claim 15 further comprising instructions for executing a remove from front function for removing a front-most element from the queue, the instructions for executing a remove from front function comprising instructions for:

locking the queue;

if the queue is not empty and the front-most element's next pointer is not null, setting the head pointer to an address in the front-most element's next pointer; and if the queue is not empty and the front-most element's next pointer is null, as an atomic compare and exchange, if the tail pointer points to the front-most element, pointing the tail pointer to the head pointer, thereby implicitly unlocking the queue.

25. The system of claim 24 further comprising instructions for, responsive to performance and failure of the atomic compare and exchange, waiting for the next pointer of the front-most element to become non-null and pointing the head pointer to the element pointed to by the next pointer of the front-most element, thereby implicitly unlocking the queue.

26. The system of claim 15 further comprising instructions for executing a remove specific function for removing a target element from the queue, the instructions for executing a remove specific function comprising instructions for:

locking the queue;

determining if the queue is not empty; and if the queue is not empty:

traversing the queue to locate the target element; and if the target element's next pointer is not null and the target element is not addressed by the previous value of the head pointer, setting the next pointer of an element previous to the target element to point to an element pointed to by the target element's next pointer, and return the head pointer to the previous value, thereby implicitly unlocking the queue.

27. The system of claim 26 further comprising instructions for:

if the target's next pointer is not null and the target is addressed by the previous value of the head pointer, setting the head pointer to point to the element pointed to by the target's next pointer, thereby implicitly unlocking the queue;

if the target's next pointer is null and the target is not addressed by the previous value of the head pointer, setting the next pointer of the element prior to the target to null; and if the target's next pointer is null, as an atomic compare and exchange, if the tail pointer points to the target set the tail pointer to point to the element previous to the target, or to point to the head pointer if the target is addressed by the previous value of the head pointer.

28. The system of claim 27 further comprising instructions for, responsive to performance and failure of the atomic compare and exchange:

waiting until the target's next pointer is not null;

if an element addressed by the target's next pointer is an only remaining element in the queue, setting the head pointer to point to the only remaining element, thereby implicitly unlocking the queue;

if the element addressed by the target's next pointer is not the only remaining element in the queue, setting the next pointer of the element previous to the target to the address in the next pointer of the target and setting the head pointer to the previous value of the head pointer, thereby implicitly unlocking the queue; and if the atomic compare and exchanged was performed and succeeded:

if the queue is not empty, setting the head pointer to the previous value of the head pointer, thereby implicitly unlocking the queue.

* * * * *